United States Patent [19]

Booth et al.

[11] 4,230,147

[45] Oct. 28, 1980

[54] CONSTANT FLOW VALVE

[75] Inventors: Jack J. Booth; William C. Branch; Robert P. Kidd, all of Dallas, Tex.

[73] Assignee: Booth, Inc., Carrollton, Tex.

[21] Appl. No.: 876,001

[22] Filed: Feb. 8, 1978

[51] Int. Cl.³ ............................................. G05D 7/01
[52] U.S. Cl. ..................................... 137/504; 137/606
[58] Field of Search ............................... 137/501, 504

[56] References Cited

U.S. PATENT DOCUMENTS 3,422,842  1/1969  Erickson .

Primary Examiner—Robert G. Nilson
Attorney, Agent, or Firm—Richards, Harris & Medlock

[57] ABSTRACT

A dispensing valve mechanism includes means for automatically maintaining a constant flow of fluid through a flow channel under varying fluid source pressure and and utilizes a piston movable within a chamber in response to fluid pressure to regulate the available flow area of a single outlet port in the chamber. The piston is sized to permit fluid flow around the periphery of the piston, and may have an axial flow path therethrough to serve as the primary flow path through the valve mechanism. A spring yieldably opposes axial movement of the piston that would tend to decrease the effective area of the chamber outlet port. An adjustment screw is carried in the valve body for adjusting the force exerted by the spring. The valve is particularly suited for use in liquid dispensing apparatus.

8 Claims, 4 Drawing Figures

CONSTANT FLOW VALVE

BACKGROUND OF THE INVENTION

The present invention relates to a valve mechanism for regulating the fluid flow through a conduit, and more particularly relates to a valve mechanism for automatically maintaining a uniform flow of fluid under varying pressures.

Flow control mechanisms which are adjustable to provide a proportionally variable rate of fluid flow in response to changes in fluid pressure heretofore have utilized a piston disposed within a chamber. The piston is movable within the chamber and is biased by a spring toward the inlet of the chamber. Pressurized fluid introduced through the inlet port in the chamber acts against the biasing force of the spring to move the piston axially within the chamber. The extent of axial movement within the chamber is dependent upon the fluid pressure acting against the piston at the inlet of the chamber. Fluid exits from the chamber through a plurality of outlet ports, with the rate of flow through the outlet ports being regulated by the extent to which the piston blocks the outlet ports. Accordingly, axial movement of the piston within the chamber constitutes a shutter mechanism that varies the degree of openness of the outlet ports in response to the fluid pressure at the inlet of the chamber. Typical is the regulator shown in U.S. Pat. No. 2,984,261.

In valve mechanisms of the type described, the flow of fluid introduced into the chamber through the inlet generally passes through an opening that extends through the interior of the piston to the outlet ports. Accordingly, it has been the case that leakage between the piston and chamber wall has been sought to be eliminated. Either a diaphragm arrangement or a piston-cylinder combination having very close tolerances is required to prevent flow around the outside of the piston. However, the use of sealing mechanisms between the piston and chamber wall restricts axial movement of the piston and reduces responsiveness of the valve mechanism to slight variations in pressure.

To overcome such leakage by machining the piston to an outside diameter and the chamber wall to an inside diameter of close tolerances as a practical matter, is cost prohibitive.

Another approach taken in an attempt to solve the leakage problem is that of utilizing a resilient diaphragm disposed between the piston and the chamber wall wherein the flow of fluid is directed by the diaphragm from the inlet of the chamber to the interior of the piston. Erickson; U.S. Pat. No. 3,422,842, discloses such a valve mechanism wherein a diaphragm is secured between the movable piston and the chamber wall. The diaphragm prevents fluid flow from the inlet around the exterior of the piston.

Valve mechanisms that regulate to the flow of fluid therethrough responsive to pressure of the fluid have many applications. However, the present invention is particularly suitable for employment in apparatus that dispense carbonated beverages, particularly where such beverages are mixed in situ from carbonated water and a syrup.

SUMMARY OF THE INVENTION

In accordance with the present invention, there is provided a mechanism for automatically maintaining a uniform rate of fluid flow through a flow channel under varying pressures from the fluid source. In accordance with the present invention a chamber has an inlet port and a single outlet port through the side wall of the chamber. A piston is disposed within the chamber and is sized to permit limited fluid flow around the periphery of the piston in the annulus defined between the piston and the chamber wall. The primary flow path through the valve mechanism between the inlet and outlet port may be through an axial flow path through the piston, or entirely around the outside of the piston. In either case, the flow path is of lesser flow capacity than that of the inlet port. The piston is axially and radially displaced within the chamber in response to flow generated forces. Axial movement of the piston is utilized to regulate fluid flow through the chamber outlet port. The skirt of the piston acts as a shutter to close the chamber outlet port. The valve mechanism further includes means for yieldably opposing axial movement in closure of the chamber outlet port. A mechanism in accordance with the present invention may further include means for adjusting the force exerted by the opposing means.

Further in accordance with the present invention, a liquid dispensing apparatus is provided wherein a flow channel is selectively opened from a closed condition to permit fluid flow from a source of varying pressure to a dispensing nozzle. Included is a regulator mechanism for automatically maintaining a predetermined flow rate through the flow channel from a source upstream from the valve mechanism for introducing pressurized fluid to the inlet of the regulator mechanism, and means for directing the regulated fluid flow away from the outlet of the regulator mechanism. Further in accordance with the present invention, the regulator mechanism of the above-recited combination includes a valve body of a molded material having a bore with an inlet port and a single outlet port formed therein. The mechanism further includes a piston disposed within the bore downstream from the inlet port and sized to permit fluid flow through an annulus defined between the periphery of the piston skirt and the wall formed by the bore in the valve body. The piston may also have an axial flow path therethrough of a flow capacity less than that of the inlet port, which flow path may be the primary flow path through the valve mechanism. Liquid introduced into the bore through the inlet port axially displaces the piston downstream within the bore to cover a portion of the outlet port to fluid flow. Means operably disposed downstream of the piston yieldably opposes downstream displacement of the piston that would tend to increasingly cover the available flow area of the outlet port.

Accordingly, the present invention provides a mechanism that is suitable for use in a variety of applications, including liquid dispensing apparatus for such items as carbonated beverages, and that achieves effective automatic maintenance of a selected rate of fluid flow under varying fluid source pressure conditions, yet does not require costly close tolerance machining of valve components nor sealing rings or the like that retard sensitivity of the valve mechanism.

DESCRIPTION OF THE DRAWINGS

A more complete appreciation of the invention may be had by reference to the accompanying drawings, illustrating a preferred embodiment of the invention to be described in detail, wherein.

DESCRIPTION OF THE PREFERRED EMBODIMENT

Figure 1:
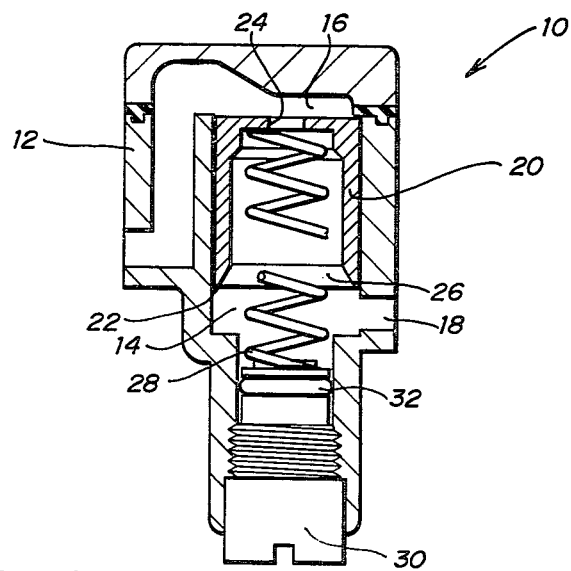
FIG. 1 is a cross-sectional view of a valve mechanism in accordance with the present invention.

Referring now to FIG. 1, there is shown a regulator valve mechanism 10 that is operable to automatically maintain a uniform rate of flow of a fluid through a flow channel under varying fluid source pressure conditions. Valve mechanism 10 has a valve body 12 that is of a generally elongate cylindrical shape. A chamber 14 defined by an elongate cylindrical bore is formed within the upper portion of valve body 12. Chamber 14 has an inlet port 16 into which fluid is introduced under the varying pressure of the fluid source. Valve body 12 further includes a single outlet port 18 through the side wall thereof.

A piston 20 is disposed within chamber 14. Piston 20 is also of a generally cylindrical configuration, with an annulus 22 being defined between the skirt portion of piston 20 and the inside wall surface of chamber 14. Piston 20 is sized to permit fluid flow around its periphery through the annulus. The primary flow path through valve mechanism 10 is, however, through an axial flow path through the interior of piston 20. More particularly, piston 20 has an opening 24 in the piston head to permit the introduction of fluid entering chamber inlet 16 into the hollow interior of piston 20. The flow entering piston 20 via opening 24 exits through the open skirt bottom area 26.

It will be appreciated that the flow capacity through opening 24 in piston 20 is less than the flow capacity of inlet 16. Accordingly, upon the introduction of fluid to chamber inlet 16, piston 20 is axially displaced downstream within chamber 14 by the pressure at inlet 16. Means, such as spring 28, is provided for yieldably opposing axial movement of piston 20 in the downstream direction. The skirt portion of piston 20 acts as a shutter to close a portion of outlet port 18 to fluid flow in response to the fluid pressure acting on the head portion of piston 20 to regulate fluid flow through the chamber outlet port.

Accordingly, as the pressure of the fluid source increases, a greater force is applied to the head of piston 20 causing it to move further downstream against the opposing force of spring 28. Downstream movement of piston 20 causes the lower skirt portion thereof to block at least a portion of chamber outlet port 18 and reduce the available flow area of that port. Because only a single outlet is provided, the piston is forced against the side of the cylinder where the single outlet is located. The flow produces the forces which cause radial displacement. This causes a contact of knife edge character at the critical point where flow regulation takes place. If the pressure of the fluid source decreases, the force exerted by spring 28 urges the piston upstream and results in an increase in the available flow area through port 18.

Adjustment of the force exerted by spring 28 in opposition to axial downstream movement of piston 20 is provided by screw 30 that is engaged in threads formed in the lower portion of valve body 12. A seal 32 is also provided to prevent leakage of fluid around adjustment screw 30. It will, of course, be appreciated that valve mechanism 10 is calibrated and set up for a particular fluid flow rate through chamber outlet port 18 in response to application of a certain fluid pressure at the chamber inlet port 16 by adjustment of screw 30 to either increase or decrease the force exerted by spring 28.

Figure 1A:
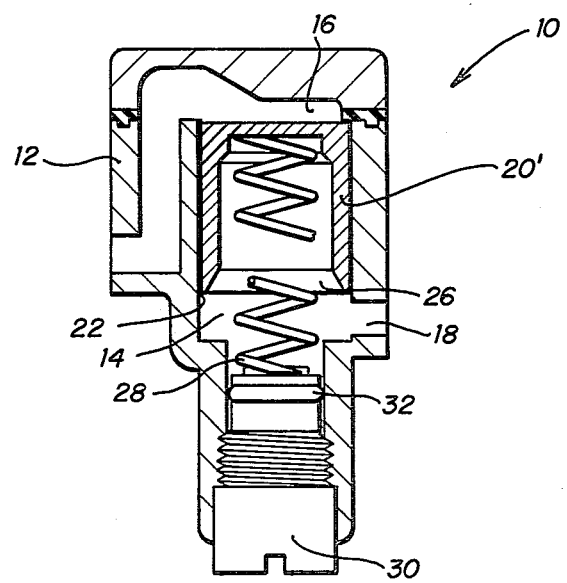
FIG. 1A is a cross-sectional view of an alternate embodiment of a valve mechanism in accordance with the present invention.

Referring now to FIG. 1A, there is shown an alternate embodiment of the regulator valve mechanism 10 of FIG. 1. A piston 20' has a solid piston head, so that the flow path for liquid is around the periphery of the piston 20' through its annulus 22. Piston 20' acts in a similar manner to piston 20 described above in FIG. 1. It is axially displaced downstream within chamber 14 by the pressure at inlet 16, whereby the skirt portion of the piston 20' acts as a shutter to close a portion of outlet port 18.

Figure 2:
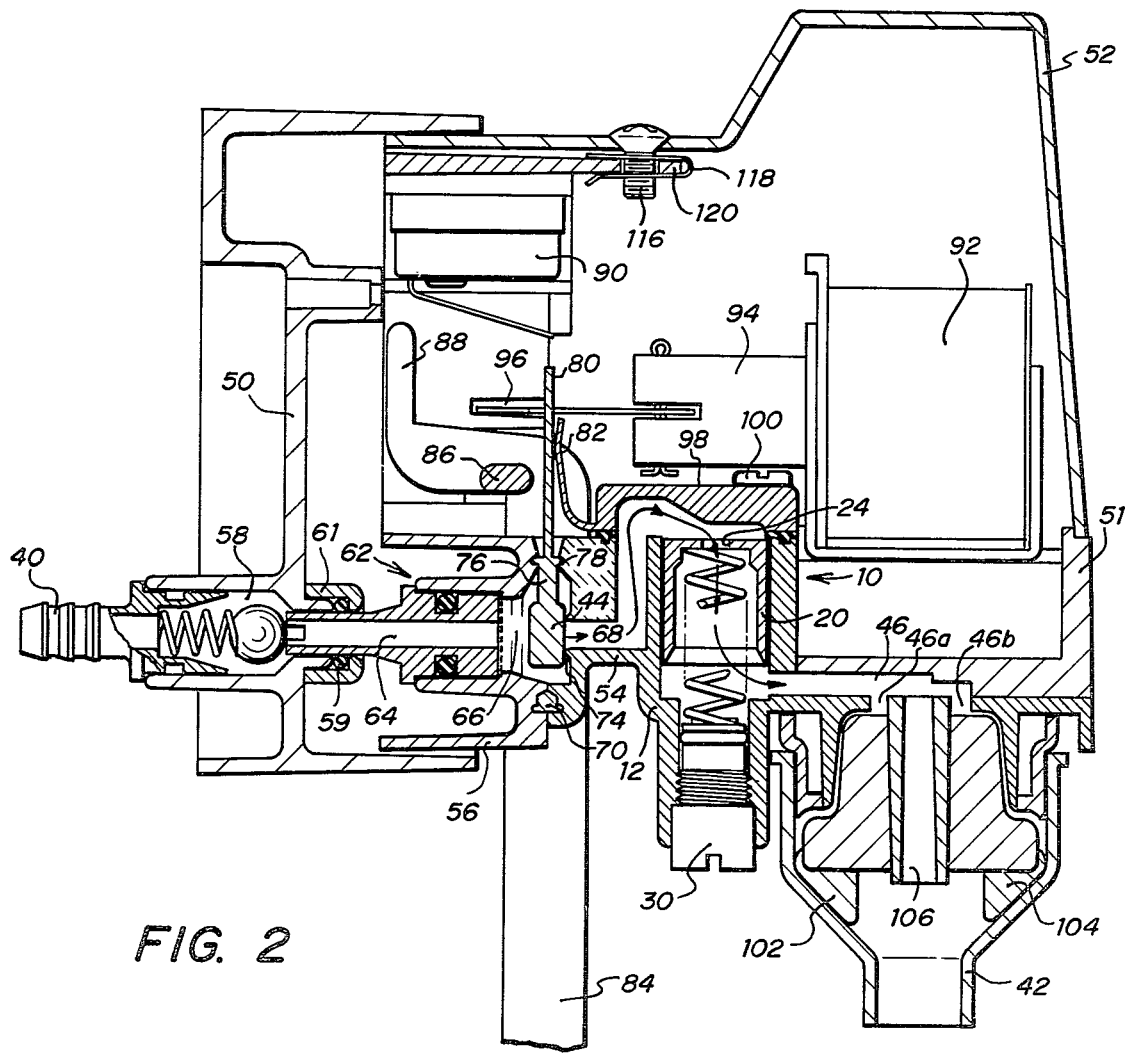
FIG. 2 is a cross section of the valve shown in FIG. 1 as utilized in a liquid dispensing apparatus.

Referring now to FIG. 2, valve mechanism 10 of FIG. 1 is shown being utilized as an element of a liquid dispensing apparatus wherein a flow channel is selectively opened from a closed condition to permit fluid flow from a source of varying pressure to a dispensing nozzle. Liquid dispensing apparatus of the type shown is typically used for the dispensing of such items as carbonated beverages which require a constant flow rate of the ingredients to assure a proper drink mixture.

Valve mechanism 10 is disposed in a flow channel that originates from a product input fitting 40 connected to a source of liquid to be dispensed through a nozzle 42, which liquid source is of a varying pressure. In addition, the liquid dispensing apparatus incorporates means, such as an actuatable control element 44, upstream from valve mechanism 10 for introducing the pressurized fluid input to the apparatus through fitting 40 to the inlet of valve 10. Further, the dispensing apparatus includes means, such as conduit 46, for directing the regulated flow away from the outlet port of the valve mechanism to nozzle 42.

In the liquid dispensing apparatus shown in FIG. 2, the various component parts are mounted within a multiple part housing that includes a quick disconnect section 50 and a cover section 52. The housing covers a multi-part body portion of the liquid dispensing apparatus that includes the valve mounting body portion 54 and portion 56 that mounts the control element 44 and its actuator mechanism.

With particular reference to the quick disconnect section 50 at the rear of the liquid dispensing apparatus, a disconnect check valve 58 is provided downstream of the product-in fitting 40. Check valve 58 is actuated to an open position upon the positioning of quick disconnect section 50 onto portion 56 of the liquid dispenser apparatus body, wherein the nozzle portion 60 of filter section 62 causes the opening of check valve 58. Quick disconnect section 50 permits the source of input fluid to the dispensing apparatus to be quickly and easily changed, as for example when a valve unit requires service, it can be quickly disconnected and replaced with a new valve.

Body portion 56 defines another portion 64 of the flow channel through the dispensing apparatus. Flow channel portion 64 includes filter fitting 62, which is mounted in a molded annular opening in body portion 56. Flow channel 64 empties into a cavity area 66 that is jointly formed by body portions 54 and 56, and within which control element 44 is disposed.

Body portion 54 defines another flow channel portion 68 to be in fluid communication with cavity area 66. Cavity 66 formed by the body portions 54 and 56 is sealed against fluid leakage at the intersection of the two body portions by seal 70.

The intersection of the body portions 54 and 56 further define a recessed circular groove 72 for mounting control element 44 within cavity 66. Control element 44 is a sealing member that comprises a rubber cap adapted for seating around orifice 74 that leads to flow channel 68 in body portion 54. An extension 76 having a grommet-like fitting 78 at the end is formed onto the main body portion of control element 44. An elongated arm extends through extension 76 and into the main body portion of control element 44. The cap portion of control element 44 is kept in a sealing arrangement with the seating surface around orifice 74 by spring member 82 that acts on member 80 to pivot the cap portion of control element 44 about a pivot point defined by grommet 78.

Control element 44 is backed away from its sealing engagement with orifice 74 by movement of member 80 against the opposing force of spring member 82. For effecting movement of member 80 to uncover orifice 74, an actuator arm 84 is pivotally mounted in the body structure comprised of body portions 54 and 56. Actuator arm 84 can be utilized in manual operation to effect movement of control element 44 by the use of a transverse member 86 mounted at the upper end of arm 84 in a position to engage member 80. Alternatively, member 80 can be actuated by an electrical system. If an electrical system is to be utilized, the extension 88 at the extreme upper end of actuator arm 84 is adapted for engaging the actuator lever of microswitch 90 which controls the supply of electric current to solenoid 92. In such case the wings 86 may be removed. Energization of solenoid 92 results in armature 94 being drawn inwardly toward the solenoid, whereupon linkage 96 will engage member 80 pulling it forward against the resistance of spring member 82.

Once control element 44 has been actuated into the open position, uncovering orifice 74, pressurized fluid supplied to cavity 66 can enter flow channel 68 and be routed to the inlet of valve mechanism 10. In the liquid dispensing apparatus shown, the body portion 12 of valve mechanism 10 is integrally molded with body portion 54. A cylinder head 98 held in position over body portion 54 by screw 100 is configured to provide a portion of flow channel 68 that directs the flow of fluid toward opening 24 in piston 20.

Flow exiting from valve mechanism 10 is directed through flow channel portion 64 that is formed within the forward portion of body portion 54. Fluid flow in flow channel portion 46 is split by two separate openings 46a and 46b to direct fluid into nozzle 42. Separated fluid flow through flow channel openings 46a and 46b is recombined in nozzle 42 after passage through respective interconnected flow channels 102 and 104. Additional ingredients may be supplied for mixing with the fluid that is routed through channels 102 and 104 by another flow channel 106 that is disposed centrally of nozzle 42. Accordingly, the liquid dispenser apparatus shown in FIG. 2 is ideally suitable for the dispensing of carbonated beverages wherein carbonated water is mixed within nozzle 42 with a syrup.

Figure 3:
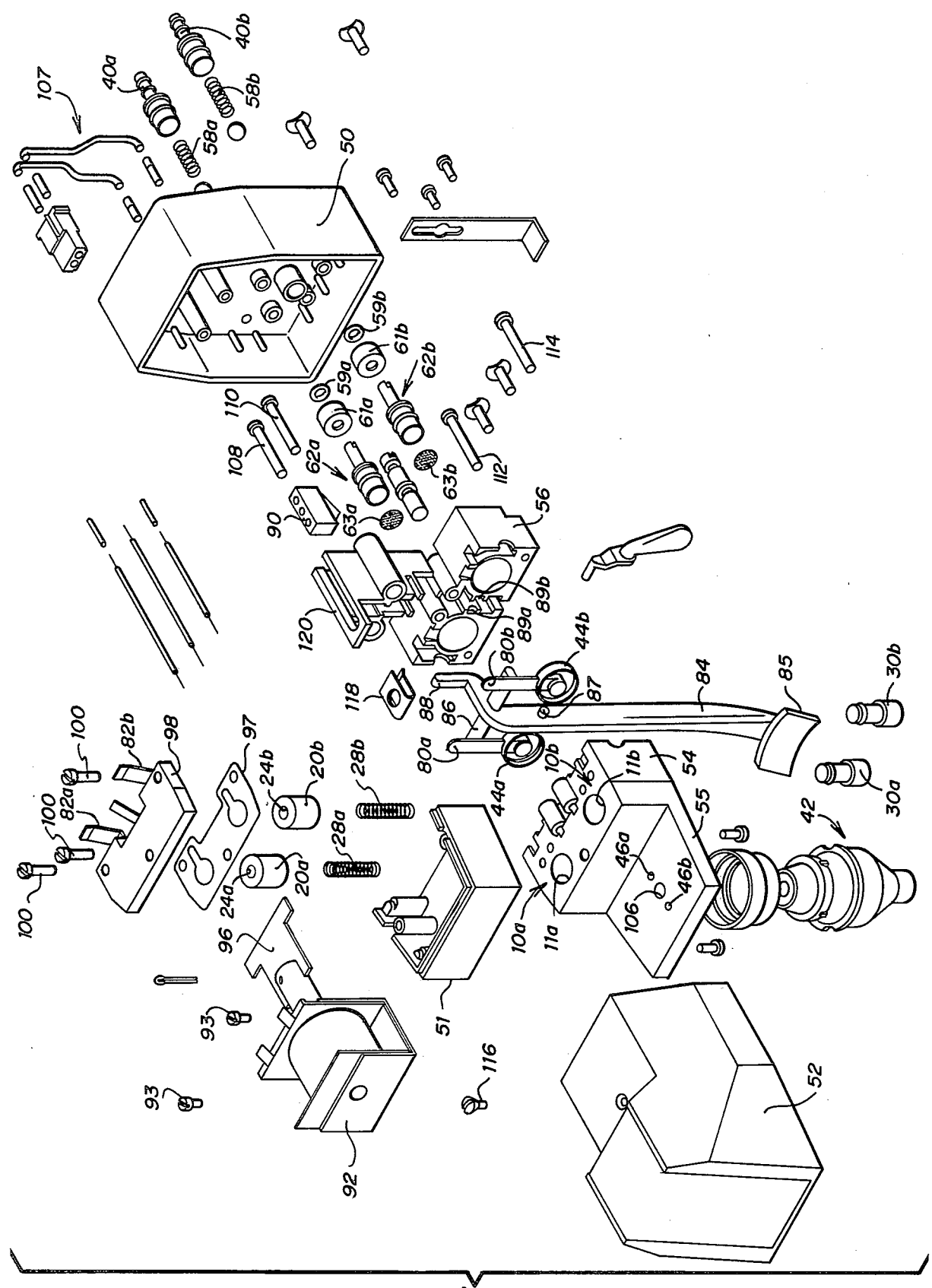
FIG. 3 is an exploded view of an overall liquid dispensing apparatus that utilizes the valve mechanism shown in FIG. 1.

Referring now to FIG. 3, an exploded view of the liquid dispensing apparatus shown in cross section in FIG. 2 is presented to give more complete details of the apparatus. As shown in FIG. 3, the liquid dispensing apparatus actually includes two product flow paths, for example, one for carbonated water and one for syrup. Therefore, the cross section view of FIG. 2 represents only one-half of the overall liquid dispenser apparatus. As shown in FIG. 3, the quick disconnect section 50 includes receptacles for accomodating the electrical wiring generally indicated by the reference numeral 107. In addition to the electrical wiring connections, quick disconnect section 50 includes product-in fittings 40a and 40b, each of which includes a ball check valve 58a and 58b. Respective O-ring seals 59a and 59b are held in position by retaining caps 61a and 61b. The entire quick disconnect assembly, as best shown in FIG. 2, is positioned over body portion 56.

Body portion 56 is a one-piece molded component adapted for mating engagement with molded body section 54. Body sections 54 and 56 are held together by screws 108, 110, 112 and 114.

Filter fittings 62a and 62b are carried in molded body portion 56, with screens 63a and 63b being provided to filter unwanted particulate matter from the flow of fluid that passes through the flow channel of the dispensing apparatus. Actuator arm 84, shown with paddle portion 85 on the lower end for engaging a cup to be filled from nozzle 42, is journaled by placement of pivot pin 87 into trunnions defined by mating semi-circular trunnion portions formed in body portions 54 and 56. In the view in FIG. 3 are the semi-circular trunnion portions 89a and 89b formed in body portion 56.

Referring now to body portion 54, first and second valve mechanisms 10a and 10b are disposed within that body section. Body portion 54 has chamber bore openings 11a and 11b formed therein. Coil spring 28a and piston 20a are disposed in bore 11a, and coil spring 28b and piston 20b are disposed in bore 11b. Head member 98 is then secured by screws 100 to the top of body portion 54 with a gasket 97 disposed in between. In this embodiment, pistons 20a and 20b while corresponding generally to the piston 20, FIG. 1, do not have an opening corresponding to opening 24. Rather, they are sized so that the total flow passes around the piston.

The frontal portion of the dispensing apparatus includes housing portion 51 adapted to be placed on top of the forwardly extending portion 55 of body portion 54. Housing portion 51 is formed to accept and mount solenoid assembly 92, which is held in position thereon by screws 93. The top housing cover section 52 is held in position over the frontal portion of the dispensing apparatus by a screw 116 that is received by clip 118. The manner of attachment of clip 118 onto the forward extension 120 is further shown in FIG. 2.

The foregoing description of the invention has been directed to a particular preferred embodiment of the present invention for purposes of explanation and illustration. It will be apparent, however, to those skilled in this art, that many modifications and changes in the apparatus may be made without departing from the scope and spirit of the invention. It is therefore intended that the following claims cover all equivalent modifications and variations as fall within the scope of the invention as defined by the claims.

What is claimed is:

1. A mechanism for automatically maintaining a uniform rate of fluid flow in a flow channel under varying pressures of a fluid source, comprising:
   (a) a chamber forming part of said flow channel having an inlet port and a single outlet port through the side wall of the chamber;
   (b) a piston disposed within said chamber sized to permit fluid flow around the periphery of the piston, said piston being axially displaceable within said chamber in response to the pressure of the fluid introduced into the chamber through the inlet port and radially displaceable by flow generated forces to maintain contact with the side wall of said chamber in the region of said single outlet port to establish sliding contact of said piston over said outlet port to produce closure action of said outlet port; and
   (c) spring means for yieldably opposing axial movement of said piston toward said outlet port.

2. The mechanism of claim 1 further comprising means for adjusting the force exerted by said yieldable opposing means.

3. The mechanism of claim 1 further comprising a valve body in which said chamber is formed, the chamber being configured as a cylindrical bore within the valve body, and a cylinder head having a flow path defined therein for directing fluid flow to the cylinder chamber inlet port.

4. The mechanism of claim 1 wherein said piston comprises a piston head portion having a central opening therein, and a piston skirt portion defining a hollow interior in fluid communication with the central opening.

5. The mechanism of claim 1 wherein said piston comprises a solid piston head portion and a piston skirt portion defining a hollow interior bore to receive said spring means.

6. The mechanism of claim 1 wherein said yieldable opposing means is a coiled spring.

7. The mechanism of claim 2 wherein said adjustment means is a screw disposed in axial alignment with said yieldable opposing means.

8. In a liquid dispensing apparatus wherein a flow channel is selectively opened from a closed condition to permit liquid to flow from a source of varying pressure to a dispensing nozzle, the combintion comprising:
   (a) a valve mechanism for automatically maintaining a predetermined flow rate through the flow channel, the valve mechanism comprising:
      (i) a valve body of a molded material having a bore with an inlet port and a single outlet port formed therein;
      (ii) a piston disposed within the bore to be downstream from the inlet port and having a piston head and a piston skirt portion, said piston being sized to permit flow around the periphery of the piston of a flow capacity less than that of the bore inlet whereby fluid introduced into the bore through the inlet axially displaces the piston downstream within the bore to cause said piston skirt portion to cover a portion of the outlet port to fluid flow; and
      (iii) means for yieldably opposing downstream displacement of said piston;
   (b) means upstream from said valve mechanism for providing pressurized liquid to the inlet of the valve body bore; and
   (c) a flow passage for carrying the regulated flow away from the outlet of the valve body bore.

* * * * *

UNITED STATES PATENT AND TRADEMARK OFFICE
CERTIFICATE OF CORRECTION

PATENT NO. : 4,230,147
DATED : October 28, 1980
INVENTOR(S) : Jack J. Booth; William C. Branch; Robert P. Kidd It is certified that error appears in the above-identified patent and that said Letters Patent are hereby corrected as shown below:

Under References Cited, the following were omitted:

| | | | |
|---|---|---|---|
| 1907162 | 5/1933 | Webb | |
| 2069022 | 1/1937 | Sisk | |
| 2584418 | 2/1952 | Branson | |
| 2647531 | 8/1953 | Berck | |
| 2777458 | 1/1957 | Stern | |
| 2800141 | 7/1957 | Hedland | |
| 2800919 | 7/1957 | Kates | |
| 2807279 | 9/1957 | Presnell | |
| 2845086 | 7/1958 | Waterman | |
| 2865397 | 12/1958 | Chenault | |
| 2984261 | 5/1961 | Kates | |
| 240955 | 1/1960 | Walker | (Australia) |
| 970737 | 6/1950 | Saulnier | (France) |

Abstract, line 4, delete "and"

Column 5, line 18, change "arrangement" to --engagement--

Signed and Sealed this

Third Day of March 1981

[SEAL]

Attest:

RENE D. TEGTMEYER

Attesting Officer

Acting Commissioner of Patents and Trademarks